US005461692A

United States Patent [19]
Nagel

[11] Patent Number: 5,461,692
[45] Date of Patent: Oct. 24, 1995

[54] MULTIMODE OPTICAL FIBER COUPLING APPARATUS AND METHOD OF TRANSMITTING LASER RADIATION USING SAME

[75] Inventor: Richard Nagel, West Chicago, Ill.

[73] Assignee: Amoco Corporation, Chicago, Ill.

[21] Appl. No.: 160,081

[22] Filed: Nov. 30, 1993

[51] Int. Cl.$^6$ .................................. G02B 6/26; H01S 3/00
[52] U.S. Cl. ............................ 385/127; 385/27; 385/28; 385/31; 385/25; 385/38; 385/39; 385/126; 385/123; 372/9; 372/109
[58] Field of Search ................................ 385/15, 27, 28, 385/25, 31, 38, 39, 43, 48, 49, 98, 123, 124, 125, 126, 127, 128, 140; 606/2, 11, 15, 16; 372/6, 9, 14, 19, 29, 108, 109

[56] References Cited

U.S. PATENT DOCUMENTS

| | | | |
|---|---|---|---|
| 3,583,786 | 6/1971 | Marcatili et al. | 385/123 X |
| 3,756,688 | 9/1973 | Hudson et al. | 385/127 X |
| 3,779,628 | 12/1973 | Kapron et al. | 385/43 X |
| 3,997,241 | 12/1976 | Nishida et al. | 385/123 X |
| 3,999,834 | 12/1976 | Ohtomo et al. | 385/123 X |
| 4,070,091 | 1/1978 | Taylor et al. | 385/126 X |
| 4,252,403 | 2/1981 | Salisbury | 385/127 X |
| 4,306,767 | 12/1981 | Kawachi et al. | 385/126 X |
| 4,392,715 | 7/1983 | Bonewitz et al. | 385/126 X |
| 4,436,368 | 3/1984 | Keck | 385/126 X |

(List continued on next page.)

FOREIGN PATENT DOCUMENTS

| | | | |
|---|---|---|---|
| 0444610A2 | 4/1991 | European Pat. Off. | 385/88 X |

OTHER PUBLICATIONS

AOFR Fiber Optic Couplers, AOFR Inc. div of *BHP Aerospace & Electronics*, Catalog (1991 pp. 2–91, 35C/15C.
"FIS Your Nest Of Fiber Optic Supplies—Fiber Optic." Catalog No. 040791, *Fiber Instrument Sales, Inc.*, 6th Ed., Oriskany, N.Y., (copyright 1991), pp. 2–5, 8–23.
Brian P. McCann, 3M Speciality Optical Fibers & Richard C. Powell, Oklahoma State University, "Optical Fibers In Medicine, Silica–Core fibers expand their use in surgical applications." *Fiberoptic Product News*, (Nov. 1991), pp. 17–20.
Kathiresan K., Fluevog J. B., Sherrets L. R., AT&T Network Cable Systems, "Fiberoptic Cables for Shipboard Applications, Fiberoptic technology is the medium of choice in the military" *Fiberoptic Product News*, (Jul. 1991) pp. 17–20.
M/A–COM.LCS, "Light Control Systems Inc.", Product data sheets, Nov. 1991, *Fiberoptic Product News*.
IRIS Medical Product Information Data Sheets of various Laser Systems, (1991–1990), IRIS *Medical*, 1990 Lit. Nos. 103, 104, 105.
Kaptron's Passive Fiber Optic Components, Product Information Bulletin Sheets, 82687, 02685, Kaptron Inc., subsidiary of AMP Inc., copyright 1991.
"Choosing Fibers For Medical Beam Delivery." *Lasers & Optronics®, Fiberoptics, (Jan. 1992), pp. 29–31, and New Product Data Sheet.*

(List continued on next page.)

*Primary Examiner*—Brian Healy
*Attorney, Agent, or Firm*—Stephen G. Mican

[57] ABSTRACT

A laser radiation source apparatus comprises a laser source means for producing laser radiation; a stepped-index optical fiber; first coupling means for coupling the laser source means with one end of the stepped-index optical fiber; and second coupling means for coupling the other end of the stepped-index optical fiber with another fiber suitable for transmission of laser radiation. The stepped-index fiber optic includes a core suitable for transmission of laser radiation, which is encompassed by at least one cladding layer and a buffer layer, in which the refractive index value for the core is greater than the refractive index value for the cladding layer, and the refractive index value for the cladding layer is greater than the refractive index for the buffer layer, so that laser radiation transmitted into the cladding layer is transmitted through the fiber. Single index fibers having several diameters may be coupled to the apparatus.

4 Claims, 3 Drawing Sheets

U.S. PATENT DOCUMENTS

| | | | |
|---|---|---|---|
| 4,564,736 | 1/1986 | Jones et al. | 219/121 L |
| 4,601,535 | 7/1986 | Tanaka et al. | 385/49 X |
| 4,676,586 | 6/1987 | Jones et al. | 385/123 X |
| 4,681,396 | 7/1987 | Jones | 385/123 X |
| 4,691,990 | 9/1987 | Cohen et al. | 385/126 X |
| 4,699,454 | 10/1987 | Brubaker | 385/14 X |
| 4,709,986 | 12/1987 | Hicks, Jr. | 385/123 X |
| 4,723,257 | 2/1988 | Baer et al. | 372/108 |
| 4,755,022 | 7/1988 | Ohashi et al. | 385/123 X |
| 4,763,976 | 8/1988 | Nolan et al. | 385/127 X |
| 4,772,081 | 9/1988 | Borgos et al. | 385/76 X |
| 4,778,240 | 10/1988 | Komatsu | 385/88 X |
| 4,784,466 | 11/1988 | Khoe et al. | 385/33 X |
| 4,795,228 | 1/1989 | Schneider | 385/33 X |
| 4,799,755 | 1/1989 | Jones | 385/33 X |
| 4,807,954 | 2/1989 | Oyamada et al. | 385/43 X |
| 4,840,451 | 6/1989 | Sampson et al. | 385/88 X |
| 4,852,968 | 8/1989 | Reed | 385/123 X |
| 4,875,755 | 10/1989 | Borgos et al. | 385/123 X |
| 4,974,932 | 12/1990 | Nattermann et al. | 385/126 X |
| 4,983,008 | 1/1991 | Campbell et al. | 385/134 X |
| 4,986,620 | 1/1991 | Severijns et al. | 385/43 X |
| 4,993,796 | 2/1991 | Kapany et al. | 385/47 X |
| 4,994,059 | 2/1991 | Kosa et al. | 606/12 |
| 5,013,129 | 5/1991 | Harada et al. | 385/47 X |
| 5,032,001 | 7/1991 | Shang | 385/126 X |
| 5,035,477 | 7/1991 | Schlump | 385/43 X |
| 5,134,681 | 7/1992 | Ratovelomanana et al. | 385/130 |
| 5,170,458 | 12/1992 | Aoyagi et al. | 385/127 |

OTHER PUBLICATIONS

McCann B. P., 3M Speciality Coaxial Fibers, "New Fiberoptic Paths For Surgical Lasers—Silica–core fibers enhance performance of medical laser delivery systems." *Lasers & Optronics,* Fiberoptics (Nov. 1990), pp. 51–58.

Lasertron's Pump Laser data sheets, QLM9S470, ALM9S450, *Lasertron Inc.,* DS450& 70.PM4 Dec. 1991, DS450&70.PM4 Dec. 1991.

The Short–Form Catalog, 92SFCAT.PM4 (Dec. 1991) by *Lasertron Inc.*

Miller G., "Splicing: caveat emptor.", editorial in Lightwave, vol. 8 No. 9, (Aug. 1991) p. 4.

"Laser Literature from Nexis." Hewlett–Packard Journal Feb. 1993; Penton Publishing Oct. 1992; Horizon House Microwave Inc. May 1992; Gordon Publications Apr. 1992, Feb. 1992, Jan. 1992., *NEXIS,* pp. 1–24.

"Diode Microlasers." *Photonics Spectra,* Innovative Products, (Dec. 1991) p. 160, Amoco Laser, Circle No. 131.

McCann Brian P., "Fiber Holds The Key To Medical Lasers' Success." *Photonics Spectra,* Fiber/Medical Lasers (May 1990) pp. 127–128, 131–132, 134, 136.

"Silica/Silica Fiber Series." Product List Sheets, *Polymicro Technologies Inc.,* FO1/01/91.

n1 > n2 < n3 n1 > n2 > n3 > n4

MULTIMODE OPTICAL FIBER COUPLING APPARATUS AND METHOD OF TRANSMITTING LASER RADIATION USING SAME

TECHNICAL FIELD

This invention relates to the general subject of lasers, and to an apparatus and method for coupling a source of laser radiation through a stepped-index optical fiber to a single index optical fiber selected from a group of single index optical fibers having different diameters and numerical apertures.

BACKGROUND OF THE INVENTION

In a number of commercial products, laser radiation is transmitted through optical fibers, which act as waveguides. Examples include ophthalmic and other medical apparatus in which laser radiation is transmitted through optical fibers, which are manipulated by physicians to apply the laser beam that is emitted from the end of the fiber for medical procedures.

In many cases, solid state diode lasers are the source of laser radiation that is transmitted through optical fibers used for medical purposes. Solid state diode lasers offer advantages over other sources of laser radiation. They are more reliable and more efficient than other sources of laser radiation. They require less power than other laser sources. Because of their small size, they may be used as the source of laser radiation in transportable laser devices. One disadvantage of diode lasers, however, is that the laser radiation they produce diverges more than laser radiation produced by other laser sources. Thus, it is relatively difficult to focus laser radiation produced by a diode laser into a small fiber with good efficiency. Generally, the smaller the diameter of the fiber in relation to the laser beam produced by a diode laser, the more energy is lost in attempting to couple the laser energy into the fiber.

As is reported in *Lasers & Optronics*, Vol. 11, No. 4, p. 17 (Gordon Publications, Inc. 1992), diode lasers are used for a number of medical procedures. For example, present ophthalmic diode laser products provide a maximum of 1 to 4 W at 800 nm, and are used for transpupillary, endo-ocular, and transscleral photocoagulation procedures. Products are used with slit lamp, indirect ophthalmoscope, or bare-fiber endoscopic delivery accessories. The deeply penetrating 800-nm wavelength, absorbed strongly by tissues that contain melanin, is claimed by ophthalmic diode-laser manufacturers to offer advantages over blue-green argon laser wavelengths where intervening blood or tissue must be penetrated in order to treat targeted structures.

Ophthalmic diode lasers are very compact and lightweight, and are air-cooled devices (convection or forced air). They can operate from a standard 110 VAC/15 A outlet or, in some cases, from a battery pack. Products are extremely portable as a result. Most products are compatible with standard slit lamps.

Other medical diode laser products have appeared that provide 10–25 W of continuous wave power at 800–980 nanometers through a single 400–600 micron fiber. Potential future uses of such devices include tissue welding, laser hyperthermia treatment of tumors, dermatology applications, and photodynamic therapy. Scientific products that provide several watts at 680 nm are expected within the next year or two, and may eventually find medical applications in photodynamic therapy, ophthalmology, and dermatology.

Therapeutic devices used with diode lasers typically incorporate an optical fiber suitable for transmitting laser radiation. Such fibers generally have a central core which is surrounded by a layer, which is sometimes referred to as "cladding", which, in turn, is sometimes enclosed by a layer called a "buffer". The buffer serves no optical purpose; it serves as a mechanical protection for the fiber. For example, U.S. Pat. No. 4,691,990 to Cohen et al., discloses that optical fibers typically comprise a central region, the core, having a refractive index that is greater than the refractive index of the material surrounding the core, usually referred to as the cladding. It also discloses that both the core and the cladding generally comprise silica or quartz as a major constituent.

Different medical or industrial laser devices use optical fibers having different diameters. Laser radiation is most efficiently transferred from a laser emitting device to an optical fiber that is part of a therapeutic device if the source of the laser radiation is approximately the same diameter as the central core. If the diameter of the optical fiber is smaller than the diameter of the source of laser radiation, energy is lost because not all of the radiation is directed into the fiber.

On the other hand, when a source of laser radiation is focused onto a fiber tip, a distribution of radiation falls upon the tip at various angles and diameters. When the focus spot is optimized for a given fiber core size, there is also some collateral portion of light that falls outside of the acceptance angle and diameter of the core fiber, falling instead on the fiber cladding. Usually this radiation is mostly absorbed by the fiber buffer material that encompasses the cladding, and is lost as unguided radiation.

SUMMARY OF THE INVENTION

It is an object of the invention to provide a means by which single index optical fibers can be joined to a source of laser radiation.

It is another object of this invention to provide a means for using a step-indexed optical fiber to couple a laser radiation source to single index optical fibers of various diameters.

In accordance with the present invention a laser radiation source apparatus includes a laser source means for producing laser radiation; a stepped-index optical fiber; first coupling means for coupling the laser source means with one end of the stepped-index optical fiber; and second coupling means for coupling the opposite end of the stepped-index optical fiber with another fiber suitable for transmission of laser radiation.

The stepped-index optical fiber includes a core suitable for transmission of laser radiation. The core is encompassed by a first layer suitable for transmission of laser radiation. The first layer is encompassed by at least one other layer suitable for transmission of laser radiation. In the case of a fiber which has a core encompassed by three layers, the first layer (closest to the core) and the second layer, which encompasses the first layer, are both called "cladding", while the outer layer is referred to as a "buffer". The refractive index value of the core in the stepped-index fiber used in the present invention is greater than the refractive index value of the first layer; the refractive index of the first layer is greater than the refractive index of the second layer; and the refractive index value of the second layer is greater than the refractive index value of the buffer.

The advantages of this invention are several fold. First, the use of the stepped-index optical fiber having refractive indexes as described above provides for better transmission of laser radiation because the cladding is capable of transmitting radiation without appreciable losses. Thus, laser radiation that falls outside the acceptance angle and diameter of the core fiber and falls on the cladding layers may be transmitted through the cladding. When the index of refraction of the cladding is lower than the index of refraction of the core, and the index of refraction of the buffer surrounding the cladding is lower than the index of refraction of the cladding, the cladding functions as additional "core" and the buffer functions as additional "cladding". A single fiber optic (which has at least one or more cladding layers and a buffer layer) can function as if it were a number of different fibers having different diameters and numerical apertures, in which laser radiation transmitted through the fiber can be focused at the minimum diameter, with successive increasing diameters providing increasing efficiencies of output coupling. The result is that a variety of single index fibers having different diameters can be coupled to the output end of the stepped-index fiber, so that by utilizing a variety of shapes and lensing configurations on the output end of the stepped-index fiber, different radiation distribution results can be obtained.

For example, for a stepped-index fiber with a core, two cladding layers and a buffer layer, in which the core has a diameter d 1 of about 200 microns, the first cladding layer has a diameter d2 of about 250 microns, and the second cladding layer has a diameter d3 of about 300 microns, single index fibers having diameters of d1, d2, or d3 can be coupled to the output end of the stepped-index fiber.

The apparatus of this invention may be used in medical applications. Different medical procedures use different "spot" sizes (the size of the laser radiation that is used for diagnostic or therapeutic purposes). As the spot size increases, it is usually desired that the power also increase to maintain an energy density. By matching a certain fiber tip to a fiber diameter and numerical aperture on the output end of the apparatus of this invention, various desired effects can be realized. The apparatus of this invention also may be used in scientific or other applications in which different spot sizes may be used.

In a preferred embodiment of this invention, the laser source means is a diode laser, and the first coupling means is a lens. The diode laser, lens, and stepped-index optical fiber are mechanically isolated from shocks or vibrations that may be transmitted to the housing of the apparatus.

This invention also includes a method of transmitting laser radiation from a source of laser radiation to a single index optical fiber having a diameter ranging from $d_i$ to $d_j$, where $d_i$ is less than $d_j$. The method comprises optically coupling the source of laser radiation to one end of a stepped-index fiber having a core and at least two layers encompassing the core, wherein at least one of the layers is capable of transmitting the laser radiation, and optically coupling the other end of the stepped index fiber to a single index fiber having a diameter ranging from $d_i$ to $d_j$.

THE DRAWINGS

DETAILED DESCRIPTION

Figure 1:
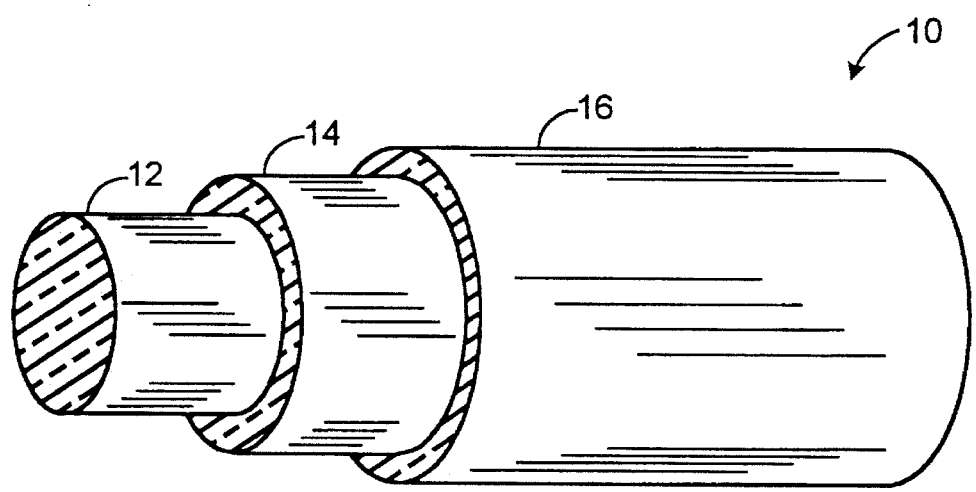
FIG. 1 is a diagram of an optical fiber having a core encompassed by a cladding layer, which, in turn, is encompassed by a buffer layer.

One embodiment of this invention is shown in the drawings and described below. This embodiment is an example of the principles of this invention. It is not intended to limit the invention to the specific embodiment that is illustrated and discussed herein.

An important aspect of this invention relates to the use of optical fibers in which the refractive index of each inner layer is higher than the refractive index of the layer that encompasses it. As is shown in FIG. 1, a typical optical fiber 10 is composed of a core 12, which is encompassed by a radiation conductive intermediate layer 14, commonly referred to as the cladding. The cladding layer 14 is encompassed by a buffer layer 16.

Figure 2:
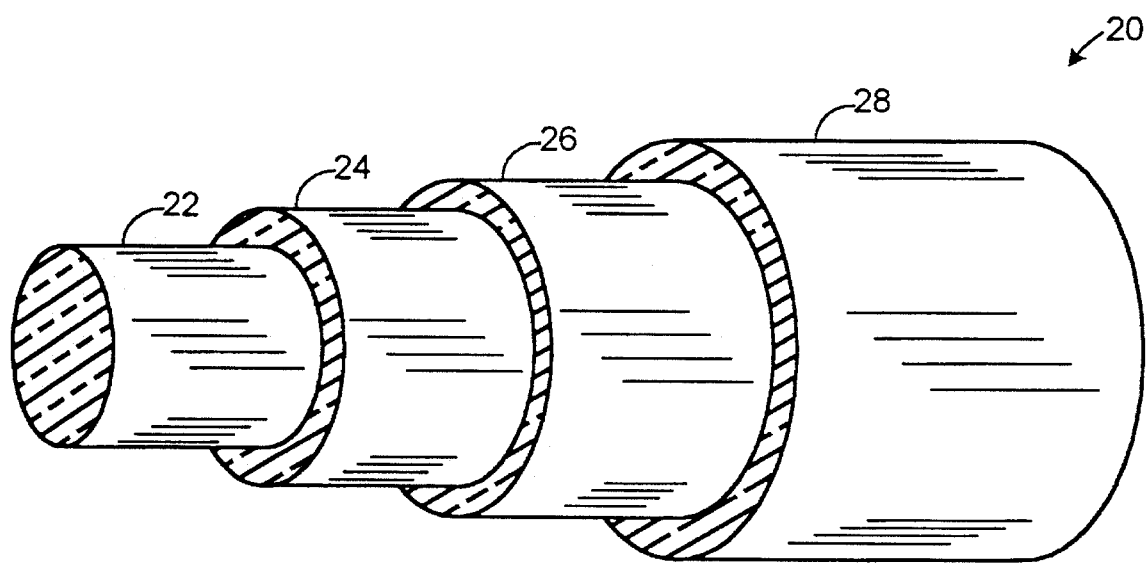
FIG. 2 is a diagram of an optical fiber having a core encompassed by a first cladding layer, which is encompassed by a second cladding layer, which is encompassed by a buffer layer.

As is shown in FIG. 2, optical fibers 20 may have more than one cladding layer. In the fiber shown in FIG. 2, the core 22 is encompassed within cladding layer 24, which is encompassed within cladding layer which is encompassed within buffer 28.

Figure 3:
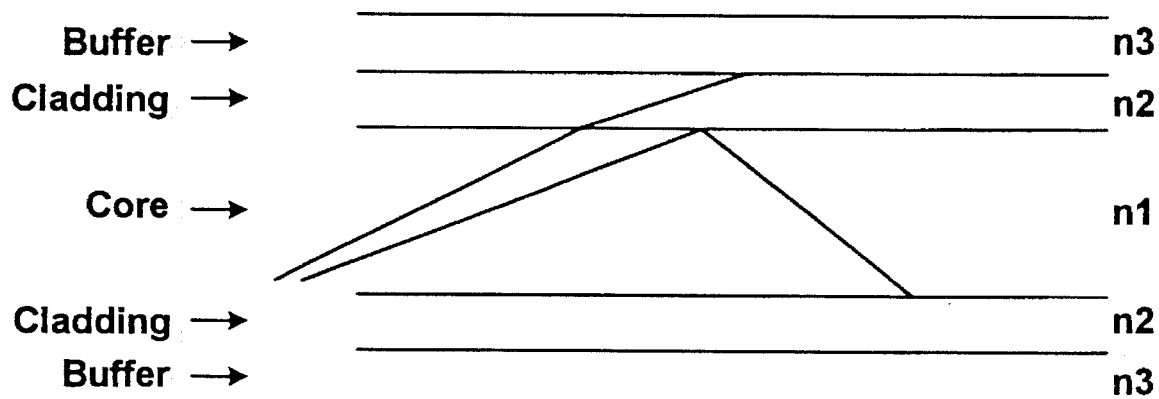
FIG. 3 is a diagram showing how laser radiation is transmitted in fibers in which the refractive index n3 of the buffer is greater than the refractive index n2 of the cladding, which is less than the refractive index n1 of the core.
Figure 4:
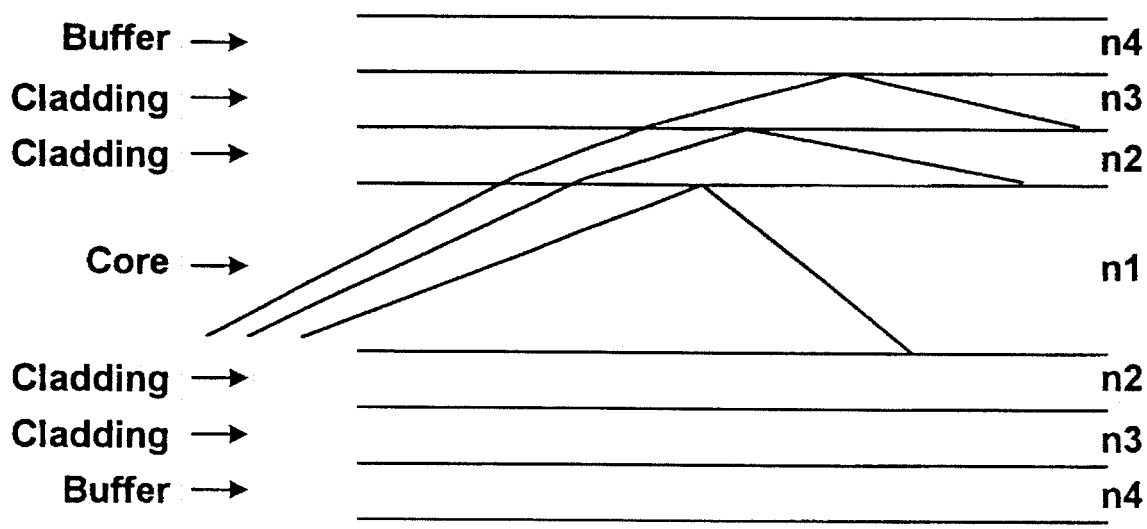
FIG. 4 is a diagram showing how laser radiation is transmitted in a fiber in which the refractive index n of each layer is less than the refractive index of the layer which it encompasses.

FIGS. 3 and 4 are diagrams which demonstrate the effect of the respective refractive indexes n of each layer of the fibers. In FIG. 3, the refractive index n1 of the core is greater than the refractive index n2 of the cladding which encompasses the core. The refractive index of the buffer n3 is greater than the refractive index of the cladding. The net effect is that when laser radiation is transmitted into the cladding, it is absorbed in the buffer and not transmitted through the cladding. On the other hand, where the refractive index n of each layer is less than the refractive index of the layer which it encompasses, as is the case in FIG. 4, laser radiation transmitted into either layer of the cladding is reflected and travels through the fiber.

In one embodiment of this invention, the stepped-index fiber 20 shown in FIG. 2 has a core 22 composed of silica having a diameter of 200 microns and a refractive index of about 1.5. The core is encompassed by a first cladding layer 24. First cladding layer 24 is composed of silica, and has a thickness of about 50 microns and a refractive index of about 1.45. First cladding layer 24 is encompassed by second cladding layer 26. Second cladding layer 26 is composed of fluoro silicones and has a thickness of about 50 microns and a refractive index of about 1.38. Second cladding layer 26 is encompassed by buffer layer 28. Buffer layer 28 is composed of silicone, and has a thickness of about 300 microns.

Figure 5:
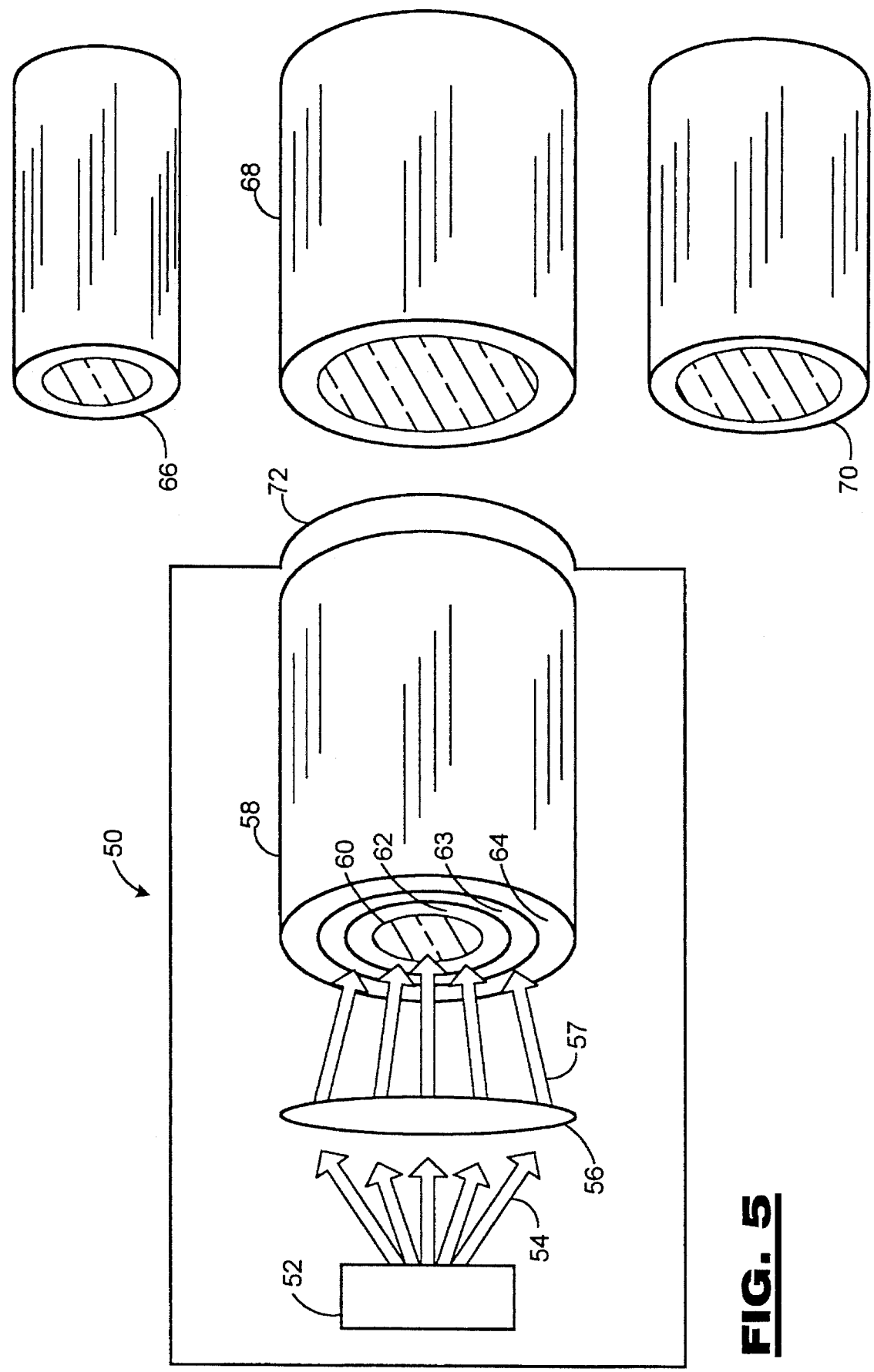
FIG. 5 is a diagram of one embodiment of the present invention.

An apparatus in accordance with the present invention is shown diagrammatically in FIG. 5. The apparatus includes a container 50 in which the laser radiation source 52, coupling means 56 and stepped-index fiber 58 are enclosed, and are preferably mounted in such a manner as to be isolated from shocks and vibrations transmitted to container 50. Laser radiation source 52 may be a laser light source, and may include, but is not limited to, laser diodes, light-emitting diodes (including superluminescent diodes and superluminescent diode arrays) and laser diode arrays. The laser radiation source may be coupled to fiber 58, either directly, or by using a coupling means such as a lens 56, which converges divergent radiation 54 to be convergent radiation 57 toward the fiber 58. Typical coupling means include graded index or "GRIN" lenses, or standard relay lens systems, which are well known to those skilled in the art.

Fiber 58 is a stepped-index fiber which includes a generally cylindrical laser radiation transmitting core 60, at least two cladding layers 62 and 63, and buffer 64. First cladding layer 62 generally encompasses core 60. Second cladding layer 63 generally encompasses first cladding layer 62. Buffer layer 64 generally encompasses cladding layer 63. The refractive index n1 of core 60 is greater than the refractive index n2 of cladding layer 62, which, in turn, is greater than the refractive index n3 of cladding layer 63, which, in turn, is greater than the refractive index n4 of buffer 64. In general, regardless of how many layers of material encompass core 60 of stepped-index fiber 58, the refractive index of each transmitting cladding layer must be less than the refractive index of the layer that encompasses it. Thus, the core will always have the highest refractive index, which will be higher than the refractive index of the first cladding layer which encompasses the core, which will, in turn, be greater than the refractive index of the second cladding layer that encompasses the first cladding layer, and so on. This does not exclude a fiber that has one or more layers that have a refractive index greater than the refractive index of one of the cladding layers or the core, so long as the refractive index of the core is greater than the refractive index of the first cladding layer, and the refractive index of the first cladding layer is greater than the refractive index of the second cladding layer.

Because the cladding layers transmit laser radiation, the cladding layers 62 and 63 function, in essence, as additional core for the laser radiation that is transmitted into those layers. Because the laser radiation transmitted into the cladding layers is transmitted through the stepped-fiber optic 58, the stepped-fiber optic 58 can function as if it had a number of diameters and numerical apertures, in which the optimized throughput may be focused at the minimum diameter, with successive increasing diameters providing increasing efficiencies of output coupling. This allows a variety of apertures to be adapted to a single output port.

Output port 72 may comprise any suitable optic coupler known to those skilled in the art which is capable of mechanically and optically coupling the output of fiber 58 with the input of a fiber used for the desired application, such as an ophthalmic application. Commercially available optic couplers include SMA type optic couplers, ST type optic couplers, and others which are known to those skilled in the art, with fiber ferrule drilled to accept the appropriate outer diameter of the fiber optic. Thus, for example, application fiber 66, which has a diameter approximately equal to the diameter of core 60, may be coupled to fiber 58 through output port 72. In that case, the laser radiation transmitted through the core will be transmitted into application fiber 66. Alternatively, fiber 68, which has a diameter equal to the diameter of cladding layer 63, may be coupled to the output port 72. In that case, the laser radiation transmitted through the core 60, as well as the radiation transmitted through cladding layers 62 and 63, will be transmitted into fiber 68. Alternatively, fiber 70, which has a diameter equal to the diameter of cladding layer 62, may be coupled to the output port 72. In that case, the laser radiation transmitted through the core 60, as well as the radiation transmitted through cladding layer 62 will be transmitted into fiber 70.

The foregoing description is intended to be illustrative only, and is for the purpose of teaching those skilled in the art the manner of carrying out the invention. Thus, various modifications and alternatives may be made without departing from the spirit and scope of the invention as defined in the appended claims.

I claim:

1. Apparatus for providing multimode laser radiation that has a multimode optical fiber output with a plurality of concentric beam paths that is user-selectable in beam size and power, comprising:

at least one multimode source of laser radiation;

a multimode optical fiber that has a first end coupled to said source, comprising at least a multimode core that is transmissive for said laser radiation and of relatively high refractive index to serve as a first beam path for said radiation, and a plurality of claddings that encompass said core and at least an innermost one of said claddings is transmissive for said laser radiation to serve as at least a concentric second beam path for said laser radiation, with said innermost cladding having a refractive index that is less than said core and an outermost cladding having a refractive index less than said innermost cladding; and means for adjustably coupling said laser radiation that emanates from a second end of said multimode optical fiber by selectively coupling one or more of said concentric beam paths to provide a beam of radiation that has adjustable beam size and power.

2. The apparatus set forth in claim 1, wherein said multimode optical fiber has at least one intermediate cladding that encompasses said innermost cladding, that is encompassed by said outermost cladding, and that has a refractive index less than said innermost cladding and less than said outermost cladding and is transmissive for said laser radiation to serve as at least a concentric third beam path for said laser radiation.

3. The apparatus set forth in claim 1, wherein said means for coupling comprises a plurality of optical fibers of different core diameters to couple one or more of said concentric beam paths of said laser radiation that emanates from said multimode optical fiber.

4. A method for providing multimode laser radiation that has a multimode optical fiber output with a plurality of concentric beam paths that is user-selectable in beam size and power, comprising the steps of:

creating a plurality of multimode concentric waveguides for optical radiation in a multimode optical fiber;

coupling a first end of said multimode optical fiber to a source of laser radiation to create a plurality of concentric beam paths of said laser radiation through said optical fiber; and selectively coupling one or more of said concentric beam paths of laser radiation that emanate from a second end of said optical fiber.

* * * * *